United States Patent
Danzl et al.

(10) Patent No.: US 11,286,642 B2
(45) Date of Patent: Mar. 29, 2022

(54) ENERGY RECOVERY SYSTEM FOR OFF-HIGHWAY VEHICLES WITH HYDRAULIC TRANSFORMER COUPLED TO TRANSMISSION POWER TAKE-OFF

(71) Applicant: Danfoss Power Solutions II Technology A/S, Nordborg (DK)

(72) Inventors: Per William Danzl, Edina, MN (US); Michael Berne Rannow, Eden Prairie, MN (US); Meng Wang, Eden Prairie, MN (US); Chad Anthony Larish, Minnetonka, MN (US)

(73) Assignee: Danfoss Power Solutions II Technology A/S, Nordborg (DK)

( * ) Notice: Subject to any disclaimer, the term of this patent is extended or adjusted under 35 U.S.C. 154(b) by 182 days.

(21) Appl. No.: 16/388,546

(22) Filed: Apr. 18, 2019

(65) Prior Publication Data
US 2019/0316323 A1 Oct. 17, 2019

Related U.S. Application Data

(63) Continuation of application No. 15/318,031, filed as application No. PCT/US2015/035010 on Jun. 10, 2015, now abandoned.
(Continued)

(51) Int. Cl.
*E02F 9/22* (2006.01)
*B60K 25/06* (2006.01)
(Continued)

(52) U.S. Cl.
CPC ............ *E02F 9/2217* (2013.01); *B60K 25/00* (2013.01); *B60K 25/06* (2013.01); *E02F 9/202* (2013.01);
(Continued)

(58) Field of Classification Search
CPC ....... E02F 9/2217; E02F 9/202; E02F 9/2029; E02F 9/2267; E02F 9/2253; B60K 25/00;
(Continued)

(56) References Cited

U.S. PATENT DOCUMENTS

| 4,537,029 A | 8/1985 | Gunda et al. |
| 5,924,516 A | 7/1999 | Sagaser et al. |

(Continued)

FOREIGN PATENT DOCUMENTS

| CN | 101855435 A | 10/2010 |
| CN | 202 345 360 U | 7/2012 |

(Continued)

OTHER PUBLICATIONS

International Search Report and Written Opinion of the International Searching Authority for corresponding International Patent Application No. PCT/US2015/035010 dated Sep. 1, 2015, 15 pages.
(Continued)

*Primary Examiner* — Jeffrey C Boomer
(74) *Attorney, Agent, or Firm* — Merchant & Gould P.C.

(57) ABSTRACT

An energy conserving hydraulic system for a mobile work machine includes a prime mover, a drivetrain, a baseline hydraulic system, a power-take-off, a transformer, a work implement, and an accumulator. The drivetrain may include an automated manual transmission (AMT) that is rotationally coupled to the prime mover and the power-take-off. The baseline hydraulic system is powered by the prime mover and includes a first hydraulic circuit. The transformer is hydraulically coupled to second and third hydraulic circuits. The work implement is actuated by an actuator that is adapted to be simultaneously hydraulically coupled to the first and the second hydraulic circuits. The power-take-off is adapted to exchange shaft power with the transmission. A clutch selectively rotationally couples the transmission and
(Continued)

the power-take-off. The accumulator is hydraulically coupled to the second hydraulic circuit. The second hydraulic circuit is hydraulically coupled to a first rotating group of the hydraulic transformer, and a third hydraulic circuit is hydraulically coupled to a second rotating group of the hydraulic transformer.

21 Claims, 4 Drawing Sheets

Related U.S. Application Data (60) Provisional application No. 62/010,446, filed on Jun. 10, 2014.

(51) Int. Cl.
    *B60K 25/00*      (2006.01)
    *E02F 9/20*      (2006.01)
    *B60K 25/02*      (2006.01)

(52) U.S. Cl.
    CPC .......... *E02F 9/2029* (2013.01); *E02F 9/2267* (2013.01); *B60K 2025/026* (2013.01); *B60K 2025/065* (2013.01); *B60Y 2200/415* (2013.01)

(58) Field of Classification Search
    CPC ........ B60K 2025/026; B60K 2025/065; B60K 25/06; B60Y 2200/415
    See application file for complete search history.

(56) References Cited

U.S. PATENT DOCUMENTS

| | | |
|---|---|---|
| 6,655,136 B2 | 12/2003 | Holt et al. |
| 9,982,690 B2 | 5/2018 | Jagoda |
| 2001/0035011 A1 | 11/2001 | Endo et al. |
| 2008/0104955 A1 | 5/2008 | Khalil |
| 2009/0120083 A1 | 5/2009 | Peterson et al. |
| 2010/0219007 A1* | 9/2010 | Dalum .................. B60K 17/28 180/65.22 |
| 2012/0233997 A1 | 9/2012 | Andruch, III et al. |
| 2013/0061587 A1* | 3/2013 | Jagoda ................. E02F 9/2217 60/414 |
| 2013/0306395 A1 | 11/2013 | Frazier et al. |
| 2014/0012334 A1 | 1/2014 | Armstrong et al. |
| 2014/0123634 A1 | 5/2014 | Heybroek et al. |
| 2014/0166114 A1 | 6/2014 | Wang et al. |
| 2014/0171260 A1 | 6/2014 | Dalum |
| 2014/0225374 A1 | 8/2014 | Collett et al. |
| 2014/0260232 A1 | 9/2014 | Danzl et al. |
| 2015/0135863 A1 | 5/2015 | Dalum et al. |
| 2016/0024755 A1 | 1/2016 | Kobiki |
| 2017/0037601 A1 | 2/2017 | Takahashi et al. |
| 2018/0154773 A1 | 6/2018 | Dalum |

FOREIGN PATENT DOCUMENTS

| | | |
|---|---|---|
| CN | 202 644 609 U | 1/2013 |
| CN | 103 161 190 A | 6/2013 |
| CN | 103562568 A | 2/2014 |
| CN | 103732835 A | 4/2014 |
| JP | S5991238 A | 5/1984 |
| JP | H0432180 A | 2/1992 |
| JP | 8-282974 | 10/1996 |
| JP | 2008014467 A | 1/2008 |

OTHER PUBLICATIONS

Extended European Search Report for corresponding European Patent Application No. 15806061.6 dated May 15, 2018, 10 pages.
Chinese Office Action for corresponding Chinese Patent Application No. 201580030939.5 dated Sep. 4, 2018, 13 pages with English translation.

\* cited by examiner

ENERGY RECOVERY SYSTEM FOR OFF-HIGHWAY VEHICLES WITH HYDRAULIC TRANSFORMER COUPLED TO TRANSMISSION POWER TAKE-OFF

CROSS-REFERENCE TO RELATED APPLICATION(S)

This application is a continuation of U.S. patent application Ser. No. 15/318,031, filed on Dec. 12, 2016, which is a U.S. National Stage Application of PCT/US2015/035010, filed on Jun. 10, 2015, which claims benefit of U.S. Patent Application Ser. No. 62/010,446 filed on Jun. 10, 2014, and which applications are incorporated herein by reference. To the extent appropriate, a claim of priority is made to each of the above disclosed applications.

BACKGROUND

Hybrid hydraulic systems have been developed to improve fuel economy and reduce emissions for off-highway machines (i.e., off-highway vehicles). Such hybrid hydraulic systems typically include an energy storing device that may store excess energy from a prime mover and/or store energy from an actuator when the actuator is in an overrunning situation. The energy storing device may also supply energy to the actuators and thereby avoid using energy from the prime mover. The actuators may include hydraulic cylinders and/or pump/motors used to actuate and/or drive work implements. The actuators may further include drive pump/motors used to propel a mobile work machine. The actuators may further include one or more hydraulic cylinders and/or pump/motors used to steer the mobile work machine. The energy storing device may include a hydraulic accumulator.

SUMMARY

One aspect of the present disclosure relates to a hydraulic circuit architecture for mobile work machines (e.g., off-highway vehicles) that provides a hydraulic hybrid system. The hydraulic hybrid system may improve fuel economy, reduce emissions, and/or improve productivity of the mobile work machine. The hydraulic hybrid system may be less expensive than comparable electric hybrid systems known in the art. The hydraulic hybrid system may be suitable for use with wheel loaders and/or backhoe loaders.

Another aspect of the present disclosure relates to combining a hydraulic transformer, a flow control valve subsystem, and a high pressure hydraulic accumulator. The hydraulic transformer enables energy to be supplied and/or recovered at an extended range of pressures, and the hydraulic accumulator may both store and release the energy. In certain embodiments, the hydraulic circuit architecture recovers energy from lift and/or tilt cylinders as the lift and/or tilt cylinders are moving downward, aided by gravity. In certain embodiments, braking energy from a power train of the mobile work machine may be recovered. The energy may be stored in the hydraulic accumulator and later be used for a variety of functions that increase productivity, increase fuel economy, or both. When increasing productivity, the stored energy may be used to augment the prime mover and thereby serve as a secondary power source to reduce cycle time by increasing velocities of various work circuit services. The stored energy may be used to increase acceleration of the mobile work machine power train. In embodiments where the hydraulic circuit architecture increases fuel economy, energy may be both stored and released to level engine power requirements. By leveling the engine power requirements, the engine may be run at an optimum configuration, in terms of fuel efficiency (e.g., at an engine rotational speed and an engine torque output that are optimized for fuel efficiency).

The hydraulic transformer may enable direct engine leveling. During portions of a duty cycle with low average power requirements, a first pump-motor of the transformer may operate as a pump and thereby charge the accumulator. The hydraulic circuit includes an accumulator isolation valve that is open and may further include an accumulator bleed valve that is closed during the charging of the accumulator. During portions of the duty cycle with high average power, the energy stored in the accumulator can be directly supplied to a power take-off shaft (i.e., a PTO shaft) by using the first pump-motor of the transformer as a motor. By receiving and delivering energy to the PTO shaft, the prime mover may be operated in an optimum efficiency region of an operating range of the prime mover. The direct engine leveling may allow engine downsizing thereby allowing recovery of at least some of the costs of the hydraulic system. Engine downsizing may further allow original equipment manufacturers (i.e., OEMs) to comply with various emissions and/or efficiency regulations (e.g., Tier 4 regulations).

To achieve practical operating characteristics, accurate flow sharing may be required. The accurate flow sharing may provide smooth operation of the mobile work machine and/or meet an operator's expectations of the mobile work machine. The operator's expectations may be based on the operator's experience in operating conventional mobile work machines. To achieve accurate flow sharing, position feedback may be implemented from directional control valves and/or mode valves of the hydraulic circuit architecture. The position feedback may be provided by linear variable differential transformers (i.e., LVDTs). In certain embodiments, the LVDTs may be incorporated into and integrated with the directional control valves and/or the mode valves. In certain embodiments, the LVDTs may be added to conventional directional control valves. In certain embodiments, a hybrid system electronic control unit (i.e., ECU) directly controls the position of the directional control valves by modulating a control pilot pressure supplied to the directional control valves.

The hydraulic system architecture may include the authority to de-stroke a main pump or a plurality of main pumps if a hybrid system controller calculates that stored energy within the accumulator can be supplied to meet some or all of the flow requirements of the hydraulic system architecture. A form of this communication may depend on a baseline hydraulic system architecture of the mobile work machine. Certain conventional mobile work machines include a pilot pressure to the main pump or pumps. Certain more recent conventional mobile work machines may use an analog or digital electrical signal transmitted to electronically controlled main pumps. This signal may be computed using a load sense pressure measurement, an excess flow pressure measurement, and/or a service pressure (e.g., a service pressure of a tilt cylinder and/or a lift cylinder). The various pressure measurements may be communicated to the hybrid system ECU via a controller area network bus (i.e., a CAN bus).

In certain embodiments, flow control between the transformer, the tilt service, and the lift service is controlled by an electronic control unit of a valve subsystem. One such valve system including suitable position feedback and flow control capability is the ZTS16 subsystem sold by the Eaton Corporation of Cleveland, Ohio. The valve subsystem may include a pair of pilot operated proportional valves with position feedback and flow control capability. The valve subsystem allows for simultaneous supply flow to both the tilt and the lift services, or allows for simultaneous recovery of flow from both the tilt and the lift services, or allows supply or recovery flow from a single one of the tilt or lift services. The valve subsystem may function as a mode valve. The valve subsystem may determine the position of these valves. In addition, a position of directional control valves of the tilt and the lift services are determined. An equivalent flow orifice area may thereby be computed and flow may be divided between different paths to sum to equal the requested flow from the operator.

The requested flow from the operator may be measured by joystick signals that are either operated by hydraulic pilot pressure or electrical signals, depending on how the mobile work machine is configured. A flow request is computed by the hydraulic system ECU based both on the joystick commands and the system pressures. An operating map may be used to resolve a flow requirement from the joystick commands and the system pressures. The operating map may be a lookup table stored in the hydraulic system ECU memory. Flow routing may be computed by a control algorithm that optimizes energy recovery using an objective function based on flow tracking, torque tracking, and energy recovery.

A clutch may be used to disconnect the power take-off output shaft from the prime mover or a transmission connected to the prime mover. By disconnecting the clutch, mechanical losses from using the hydraulic transformer may be eliminated when the energy recovery system is not in use. The clutch may be commanded by the hydraulic system electronic control unit. The hydraulic system ECU may send an electronic or hydraulic signal depending on the configuration of the mobile work machine. The transmission may be an automated manual transmission (AMT). Such AMTs are sold by the Eaton Corporation of Cleveland, Ohio.

The AMT may enable powertrain control to account for power drawn and returned by the hydraulic system. The AMT may incorporate a clutch. The AMT may provide simplified transmission control. The AMT may further increase fuel economy potential of the mobile work machine by allowing a second source of power from the hydraulic transformer to effectively unload the power requirement of the prime mover. In conventional wheel loaders, a conventional torque converter does not allow a second source of power to effectively unload the prime mover. The AMT allows the prime mover to be unloaded and loaded by the hydraulic transformer in a simple and controllable manner.

A normally opened two-position two-way valve may be used to bleed down the accumulator. The bleed down valve may be controlled by the hydraulic system ECU. The hydraulic bleed down valve may provide safe servicing by discharging the accumulator when the mobile work machine is turned off and/or if certain emergency power loss situations arise.

A normally closed two-position two-way valve may be used to isolate the accumulator. By isolating the accumulator, leakage may be prevented from the accumulator when energy is being stored within the accumulator. The accumulator isolation valve may be opened any time that flow is required to or from the accumulator. When the accumulator isolation valve is closed, a relief valve may limit the pressure across the first pump-motor.

Another aspect of the present disclosure includes configuring the hydraulic system architecture in a ride control mode. A ride control mode valve may be added, and functions of a conventional ride control system may be achieved with the hydraulic circuit architecture. As the hydraulic circuit architecture already includes a substantial high pressure accumulator, a separate accumulator for the ride control mode is not needed. The ride control mode may be added without the additional expense of the conventional ride to control accumulator, instead sharing the hydraulic accumulator of the hydraulic system. As the hydraulic accumulator of the hydraulic system is larger than typical ride control accumulators, the performance of the ride control system may be improved over a conventional ride control system. Furthermore, the first pump-motor may be used to modulate accumulated pressure. By modulating accumulated pressure, active damping may be achieved for ride control. Such actively dampened ride control may significantly improve ride control performance.

Still another aspect of the present disclosure relates to providing a majority of flow to and from the tilt and/or lift cylinders by the mode valves of the hydraulic system. In particular, the hydraulic system includes an energy recovery system including the hydraulic accumulator and the hydraulic transformer. The directional control valves may be completely closed and thereby prevent a hydraulic flow path from the rod side of the lift and/or the tilt hydraulic cylinders to tank. The mode valves of the hydraulic system of the hybrid system may be used to provide a flow path in lieu of the flow path through the directional control valves. In one embodiment, a conventional two-position two-way valve may be used. In another embodiment, a three-position three-way valve may be used. The valves may be connected to the rod side of the tilt and/or the lift cylinders. In certain embodiments, the conventional two-position two-way valve is connected to the rod side of the lift cylinder, and the three-way three-position valve is connected to the rod side of the tilt cylinder. In other embodiments, similar two-way two-position valves and/or three-way three-position valves may be used with the tilt and/or lift cylinders in other combinations. As the two-way valves and/or the three-way valves may be used to connect the rod side of the tilt and/or lift cylinders to tank, the same rod-to-tank functionality provided by the directional control valves may also be provided by the two-way and/or three-way valves.

With the three-way three-position valve, a connection may be made to the pressure supply of the tilt and/or lift services. By connecting the rod side to the lift and/or tilt supply, and further connecting the tilt and/or lift supply to the head side of the hydraulic cylinder, the hydraulic cylinder is converted into a quick-acting one-way cylinder with an effective piston area equal to the rod area. This configuration allows the cylinder to be quickly extended using a minimal amount of flow. This configuration may further allow less energy to be expended in extending the hydraulic cylinder and thereby allow for further fuel economy improvement.

Yet another aspect of the present disclosure relates to coordination of hybrid system functionalities of the hydraulic system by a supervisory control algorithm. In certain embodiments, the supervisory control algorithm resides in the hydraulic system ECU. The supervisory control algorithm may be executed by a supervisory controller and use predictive power management and optimal control algorithms to adapt the scheduling of the various hybrid functions to the particular duty cycle currently being performed by the mobile work machine. The hybrid system ECU contains duty cycle identification algorithms to determine what class of duty is being performed. The hybrid system ECU thereby chooses from a set of control motifs depending on the class of duty cycle. In certain embodiments, the machine operator can influence the classification of the duty cycle by selecting a performance mode. In particular, a "high power" mode enables a set of control motifs tuned for maximum productivity. An "economy plus" mode will focus on fuel economy improvements while maintaining the average productivity of a baseline "economy" mode. By adapting to the duty cycle in real time, and by enabling the machine operator to choose the performance mode, the hybrid system may automatically tailor its control motif to be optimal for any working condition.

In certain embodiments, a set of measurements may be used by the supervisory controller to correctly characterize the state of the hybrid system. Variables including engine speed, accelerator pedal state, brake pedal state, and forward-neutral-reverse gear index may be directly readable from the machine communication bus (e.g., the machine CAN bus, a CAN J1939 bus, etc.).

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DESCRIPTION OF THE DRAWINGS

Non-limiting and non-exhaustive embodiments are described with reference to the following figures wherein like reference numerals refer to like parts throughout the various views, unless otherwise specified.

DETAILED DESCRIPTION

Various embodiments will be described in detail with reference to the drawings, wherein like reference numerals represent like parts, like assemblies, and/or like components throughout the several views. Reference to various embodiments does not limit the scope of the claims attached hereto. Additionally, any examples set forth in this specification are not intended to be limiting and merely set forth some of the many possible embodiments for the appended claims.

The present disclosure relates generally to hydraulic circuit architectures for use in mobile work machines. A hydraulic circuit architecture, in accordance with the principles of the present disclosure, can include a propel circuit, a steering circuit, and/or a work circuit. In typical modern mobile work machines, priority is given to hydraulically power certain critical control circuits (e.g., the steering circuit).

Figure 3:
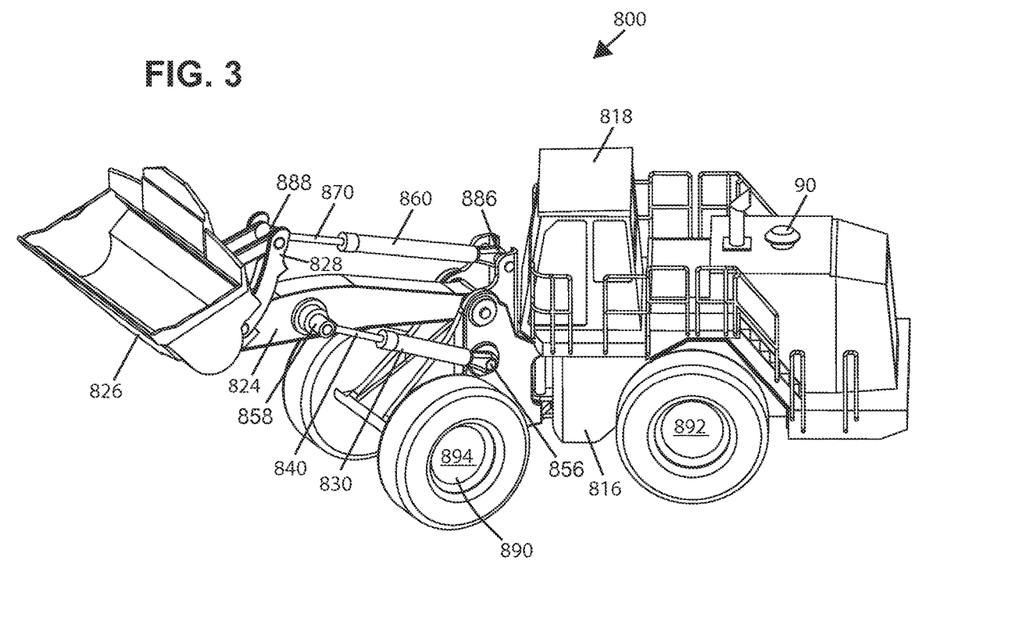
FIG. 3 is a perspective view of a wheel loader upon which the hydraulic system of FIG. 1 may be fully or partially implemented according to the principles of the to present disclosure.
Figure 4:
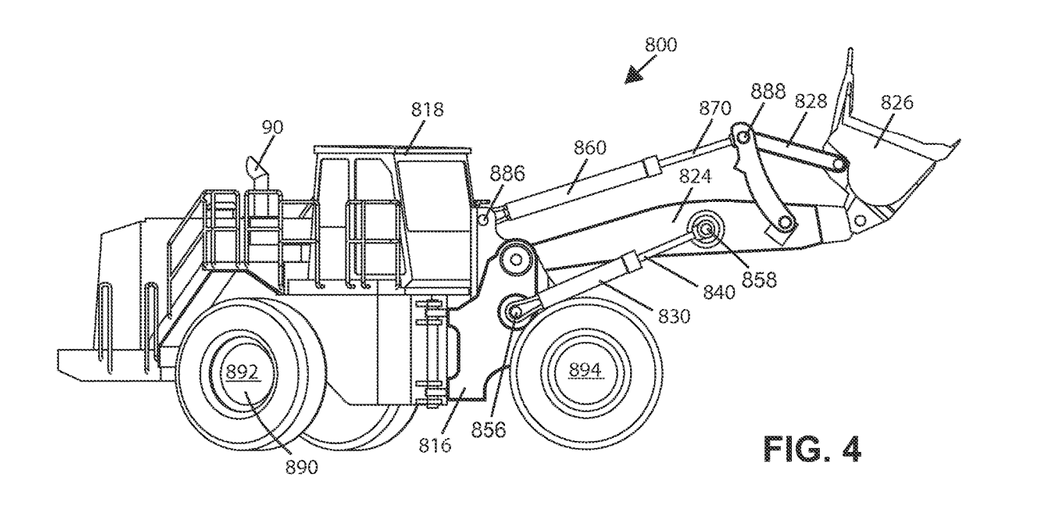
FIG. 4 is a side elevation view of the wheel loader of FIG. 3.
Figure 5:
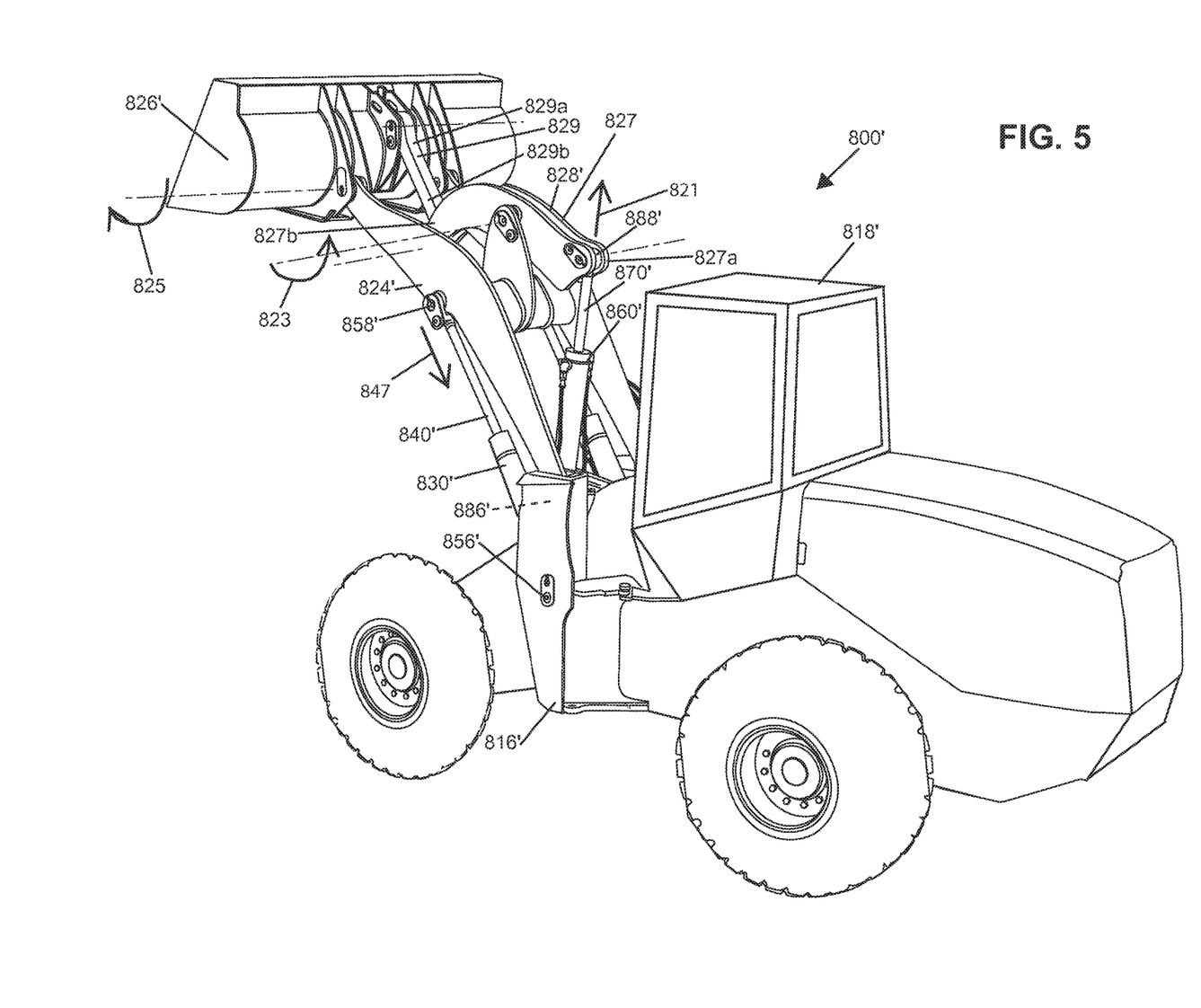
FIG. 5 is a perspective view of another wheel loader upon which the hydraulic system of FIG. 1 may be fully or partially implemented according to the principles of the present disclosure.

According to the principles of the present disclosure, a hydraulic system 10 may be included on a mobile work machine 800, 800'. In the depicted embodiment of FIGS. 3 and 4, a first wheel loader 800 is illustrated according to the principles of the present disclosure. In the embodiment illustrated at FIG. 5, a wheel loader 800' is illustrated according to the principles of the present disclosure. Although the examples provided at FIGS. 3-5 are to wheel loaders 800, 800', the hydraulic system 10 may be adaptable to other mobile work machines according to the principles of the present disclosure.

Figure 1:
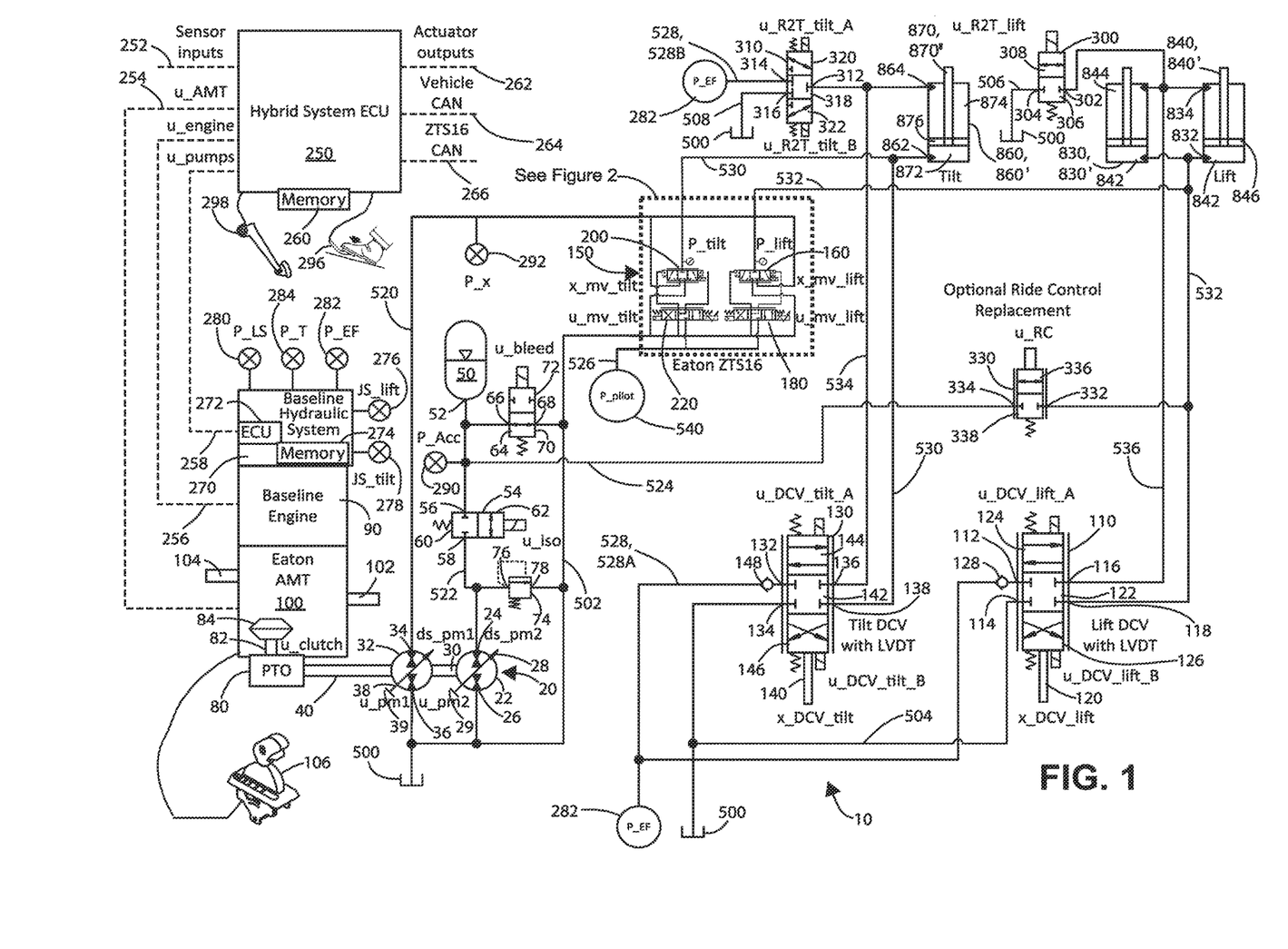
FIG. 1 is a schematic diagram of a hydraulic system having features that are examples according to the principles of the present disclosure.
Figure 2:
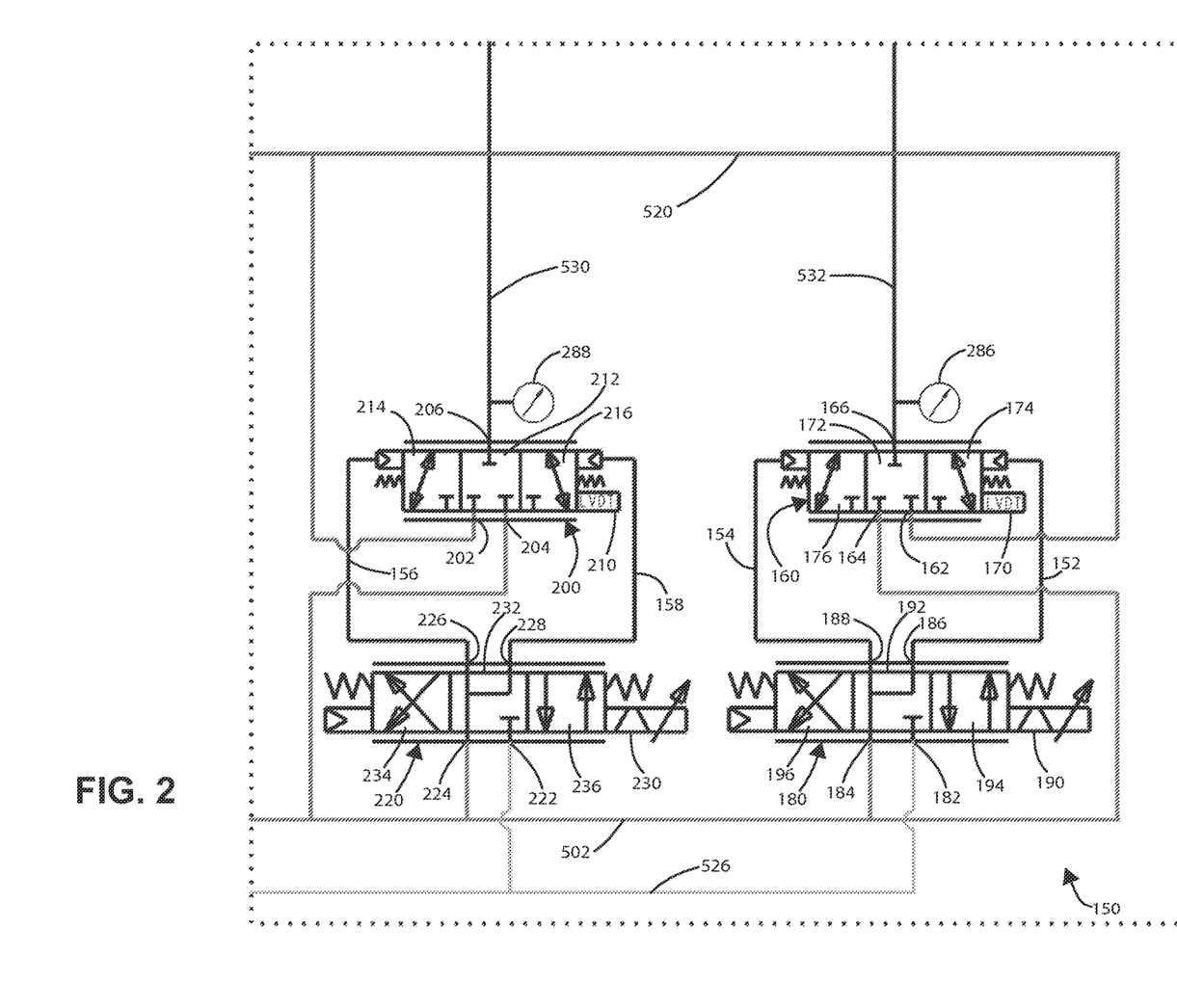
FIG. 2 is an enlarged portion of the schematic diagram of FIG. 1.

As illustrated at FIGS. 1 and 2, the hydraulic system 10 includes a variety of components, sub-systems, and control units. In certain embodiments, these components, control units, and sub-systems may be used together as illustrated at FIGS. 1 and 2. In other embodiments, only certain components, sub-systems, and/or control units may be used to provide additional embodiments according to the principles of the present disclosure. Certain embodiments may remove one or more control unit, component, and/or sub-system from the hydraulic system illustrated at FIGS. 1 and 2. Certain embodiments may add one or more additional control units, components, and/or sub-systems to the hydraulic system illustrated at FIGS. 1 and 2.

According to the principles of the present disclosure, the hydraulic system 10 provides a hydraulic hybrid system to the mobile work machine 800, 800'. The hydraulic system 10 includes an accumulator 50 with a port 52 that receives energy when pressurized hydraulic fluid is forced, under pressure, into the port 52. The accumulator 50 may also release hydraulic fluid from the port 52 and thereby provide energy to the hydraulic system 10. The mobile work machine 800, 800' further includes a prime mover 90. As depicted, the prime mover 90 may be an internal combustion engine such as a Diesel engine, an Otto-cycle engine, a gas turbine engine, etc. As depicted, the prime mover 90 may supply substantially all of the energy provided to the mobile work machine 800, 800'. The accumulator 50 may recover certain energy from various actuators of the mobile work machine 800, 800' and may further recover energy from decelerating the mobile work machine 800, 800'. The accumulator 50 may thereby convert inertial energy into potential energy stored within the accumulator 50. The hydraulic system 10 may further convert potential energy resulting from various configurations of the mobile work machine 800, 800' into potential energy stored within the accumulator 50. Such potential energy of the mobile work machine 800, 800' may include loads carried by the mobile work machine 800, 800' that are acted upon by gravity. The mobile work machine 800, 800' may itself be at an elevated position (e.g., at the top of a hill). By allowing gravity to act on the load of the mobile work machine 800, 800' or act on the mobile work machine 800, 800' itself, potential energy of the load and/or the mobile work machine 800, 800' may be converted into potential energy within the accumulator 50.

The hydraulic system 10 may release the potential energy stored within the accumulator 50. By releasing the potential energy stored within the accumulator 50, the hydraulic system 10 may drive movement of various actuators of the mobile work machine 800, 800', may drive a drive train of the mobile work machine 800, 800' and thereby move the mobile work machine 800, 800', may start the prime mover 90 (e.g., power a hydraulic starting motor), may elevate the mobile work machine 800, 800' to a higher elevation, may elevate a load carried by the mobile work machine 800, 800' to a higher elevation, etc.

In certain embodiments, the hydraulic system 10 may provide a ride control system for the mobile work machine 800, 800'. In particular, various actuators that carry loads of the mobile work machine 800, 800' may be cushioned as the mobile work to machine 800, 800' traverses uneven terrain and/or otherwise experiences dynamic loads. The hybrid system and the ride control system may both use the same accumulator 50 to store and release hydraulic energy into the hydraulic system 10.

Turning now to FIGS. 3 and 4, the example mobile work machine 800 is illustrated in detail. In particular, the mobile work machine 800 is powered by the prime mover 90. The prime mover 90 powers the hydraulic system 10 and thereby propels a drive train 890 of the mobile work machine 800. As illustrated at FIG. 1, the prime mover 90 is connected to a transmission 100. In the depicted embodiment, the transmission 100 is an automatic manual transmission (i.e., an AMT). In other embodiments, the transmission 100 may be one of a number of conventional transmissions. Such conventional transmissions may include hydrostatic transmissions, automatic transmissions with torque converters, or conventional shifted transmissions with a clutch between the prime mover 90 and an input shaft of the transmission.

In the depicted embodiment, the transmission 100 includes a first input/output shaft 102 to a rear drive train 892 and a second input/output shaft 104 to a front drive train 894. In other embodiments, the transmission 100 may connect with a drive train of a mobile work machine via a single input/output shaft.

An operator may control the direction of the mobile work machine 800 using a transmission selector 106. In particular, a forward configuration, a reverse configuration, a neutral configuration, and/or a parking configuration may be selected by the transmission selector 106. In certain embodiments, the transmission selector 106 may further be used to select various gear ratios of the transmission 100. In certain embodiments, the transmission selector 106 may be used to deselect one or more of the input/output shafts 102, 104 and thereby deselect one of the drive trains 892, 894.

As depicted at FIG. 1, the prime mover 90 further powers a baseline hydraulic system 270. As depicted, the baseline hydraulic system 270 may include an electronic control unit 272 (i.e., ECU). The baseline hydraulic system 270 may further include memory 274 that is used by the electronic control unit 272. In certain embodiments, the priority control hydraulic circuit or circuits (e.g., the steering circuit) are included in the baseline hydraulic system 270.

The baseline hydraulic system 270 may power a first hydraulic actuator 830, 830' of the mobile work machine 800, 800' and/or a second hydraulic actuator 860, 860' of the mobile work machine 800, 800'. In certain embodiments, the first actuator 830, 830' and the second hydraulic actuator 860, 860' are excluded from the priority control hydraulic circuit or circuits and instead are powered as non-priority circuits in the baseline hydraulic system 270. In the depicted embodiment, the first hydraulic cylinder 830, 830' is a lift cylinder, and the second hydraulic cylinder 860, 860' is a tilt cylinder. In the depicted embodiment, the lift cylinder 830, 830' includes a pair of hydraulic cylinders joined together in parallel, and the tilt cylinder 860, 860' is a single hydraulic cylinder. In other embodiments, the hydraulic cylinders 830, 830', 860, 860' may include multiple hydraulic cylinders and/or a single hydraulic cylinder. In the depicted embodiment, the lift cylinder 830, 830' is used to move a bucket 826, 826' between upper positions and lower positions via moving a boom and thereby change the elevation of the bucket 826, 826'. In the depicted embodiment, the tilt cylinder 860, 860' is used to tilt the bucket 826, 826'. When used together by the operator, the lift cylinders 830, 830', the tilt cylinders 860, 860', and the drive train 890 may be used to position the bucket 826, 826' in various digging, hauling, and dumping configurations. The wheel loader 800, 800' may thereby be used to move material and/or provide other useful functions.

As depicted at FIG. 1, the prime mover 90, the baseline hydraulic system 270, and/or the transmission 100 may be controlled by a hybrid system electronic control unit 250. In particular, the hydraulic system electronic control unit 250 receives sensor inputs 252 and may provide actuator outputs 262. As illustrated, the sensor inputs 252 and the actuator outputs 262 may connect directly to a particular sensor and/or a particular actuator controller. The hybrid system electronic control unit 250 may further receive inputs and outputs from the prime mover via a signal line 256. Likewise, the hydraulic system electronic control unit 250 may send and receive input and output signals from the transmission 100 via the signal line 254. In addition, the hydraulic system electronic control unit 250 may send and/or receive input and output signals from the baseline hydraulic system 270 via a signal line 258. The hybrid system electronic control unit 250 may store executable programs, system information, and/or various system state information in memory 260. As illustrated at FIG. 1, the hybrid system electronic control unit 250 may communicate via a controller area network bus 264 (i.e., a CAN bus) of the mobile work machine 800, 800'. In certain embodiments, the hybrid system electronic control unit 250 may also communicate via a separate controller area network bus 266. In the example embodiment, the controller area network bus 266 transfers information to and/or from a flow control valve subsystem 150. The hydraulic system electronic control unit 250 may further receive signals and/or send signals to an to accelerator control interface 296 and/or a brake control interface 298. The baseline hydraulic system electronic control unit 272 and the hybrid system electronic control unit 250 may work together to receive various signals including the signals from the accelerator 296 and the brake 298. The various other signals may include a load sense pressure signal 280, a non-priority circuit P_EF pressure signal 282, a tank pressure signal 284, a joystick lift signal 276 (i.e., a lift signal), a joystick tilt signal 278 (i.e., a tilt signal), and/or other signals. As depicted at FIG. 1, the hybrid system electronic control unit 250 has supervisory control over the prime mover 90, the baseline hydraulic system 270, and/or the transmission 100. In other embodiments, other architectures may be used.

As depicted at FIG. 1, the hydraulic system 10 includes a hydraulic transformer 20. The hydraulic transformer 20 includes a first rotating group 22 and a second rotating group 32. In the depicted embodiment, the first rotating group 22 is a first pump-motor, and the second rotating group 32 is a second pump-motor. The first and the second rotating groups 22, 32 are rotationally connected together by a shaft 30. The first rotating group 22 includes a first port 24, a second port 26, and a variable swash plate 28. Likewise, the second rotating group 32 includes a first port 34, a second port 36, and a variable swash plate 38. In certain embodiments, the variable swash plates 28, 38 may go over-center. In certain embodiments, one or both variable swash plates 28 and 38 are equipped with displacement sensors 29 and 39, respectively, (e.g., LVDTs).

The first rotating group 22 and the second rotating group 32 are further rotationally connected to a shaft 40. The shaft 40 is depicted as an input/output shaft and is connected to a power-take-off (i.e., PTO) 80. The power-take-off 80 includes a shaft 82 that is connected to a clutch 84. When the clutch 84 is engaged, the power-take-off 80, and thereby the shaft 40, are rotationally connected to the transmission 100. When the clutch 84 is disengaged, the power-take-off 80, and thereby the transmission 100, are rotationally disconnected from each other. The hydraulic transformer 20 is thereby rotationally connected to the transmission 100 and further to the prime mover 90.

The power-take-off 80 thereby selectively connects the hydraulic transformer 20 to the transmission 100. Energy may thereby be delivered to and from the hydraulic transformer 20 and the transmission 100. Energy may thereby be transferred from the hydraulic accumulator 50 and the drive train 890. The accumulator 50 may thereby collect inertial energy and potential energy from the mobile work machine 800, 800' and store the energy as potential energy within the accumulator 50. The hydraulic system 10 may further deliver potential energy from the accumulator 50 to the drive train 890 and thereby propel the mobile work machine 800, 800'.

The prime mover 90 may supply energy to the accumulator 50 via the hydraulic transformer 20. In particular, the prime mover 90 may be connected to the transformer 20 via the transmission 100 and the power-take-off 80. The first rotating group 22 may thereby transfer hydraulic fluid from a hydraulic tank 500 to the hydraulic accumulator 50 and pressurize the hydraulic fluid within the accumulator 50.

Energy may further be transferred between the transmission 100 and the lift cylinder 830, 830' and/or the tilt cylinder 860, 860'. In particular, the second rotating group 32 may be hydraulically connected to the lift cylinder 830, 830' and/or the tilt cylinder 860, 860' via the flow control valve sub-system 150. The hydraulic transformer 20 may thereby transfer inertial and/or potential energy to and from the mobile work machine 800, 800' and the bucket 826, 826' and the boom 824, 824' of the mobile work machine 800, 800'.

The hydraulic system 10 may further transfer energy between the accumulator 50 and the lift cylinder 830, 830' and/or the tilt cylinder 860, 860'. In particular, energy from the accumulator 50 may be used to lift the boom 824, 824' and the bucket 826, 826', and potential energy of the boom 824, 824' and the bucket 826, 826' may be transferred to the hydraulic accumulator 50 (e.g., when gravity acts on the boom 824, 824' and the bucket 826, 826' and the lift cylinder 830, 830' is moving in an overrunning direction 847, as illustrated at FIG. 5).

As illustrated at FIG. 1, the hydraulic system 10 includes a first directional control valve (i.e., DCV) 110 and a second directional control valve 130. As depicted, the directional control valve 110 may be used to actuate the lift cylinder 830, 830', and the directional control valve 130 may be used to actuate the tilt cylinder 860, 860'. The baseline hydraulic system 270 may supply pressurized hydraulic fluid to the directional control valves 110, 130 via the high pressure side of the non-priority circuit P_EF, and the directional control valves 110, 130 may correspondingly transfer the pressurized hydraulic fluid to the hydraulic cylinders 830, 830', 860, 860'. According to the principles of the present disclosure, the directional control valves 110, 130 may actuate the actuators 830, 830', 860, 860' with the hydraulic transformer 20 engaged (e.g., the PTO clutch 84 engaged) and may further actuate the actuators 830, 830', 860, 860' with the hydraulic transformer 20 disengaged (e.g., with the PTO clutch 84 disengaged). The hydraulic cylinders 830, 830', 860, 860' may be powered by both the non-priority circuit P_EF of the baseline hydraulic system 270 and by the hydraulic transformer 20 simultaneously (e.g., when the PTO clutch 84 is engaged). The non-priority circuit P_EF and the hydraulic transformer 20 may share in supplying the actuators 830, 830', 860, 860' with pressurized hydraulic fluid. The hybrid system electronic control unit 250 may coordinate this supply sharing activity (e.g., match hydraulic pressures, allocate flow, etc.).

The first directional control valve 110 includes a first port 112, a second port 114, a third port 116, and a fourth port 118. A spool within the directional control valve 110 configures connections and/or disconnections between the ports 112, 114, 116, 118 depending on the position of the spool. In particular, a first configuration 122 blocks off each of the ports 112, 114, 116, 118. A second configuration 124 connects the first port 112 and third port 116 and further connects the second port 114 and the fourth port 118. A third configuration 126 connects the first port 112 and the fourth port 118 and further connects the second port 114 and the third port 116. In certain embodiments, the spool may be varied in position and thereby connect the various ports together with additional hydraulic resistance depending on the position of the spool. The first directional control valve 110 includes a position sensor 120 connected to the spool. In the depicted embodiment, the position sensor 120 is a linear variable differential transformer (i.e., LVDT). The output from the position sensor 120 is transmitted to the hybrid system electronic control unit 250 and/or the baseline hydraulic system 270.

The second directional control valve 130 includes a first port 132, a second port 134, a third port 136, and a fourth port 138. A spool within the directional control valve 130 configures connections and/or disconnections between the ports 132, 134, 136, 138 depending on the position of the spool. In particular, a first configuration 142 blocks off each of the ports 132, 134, 136, 138. A second configuration 144 connects the first port 132 and third port 136 and further connects the second port 134 and the fourth port 138. A third configuration 146 connects the first port 132 and the fourth port 138 and further connects the second port 134 and the third port 136. In certain embodiments, the spool may be varied in position and thereby connect the various ports together with additional hydraulic resistance depending on the position of the spool. The second directional control valve 130 includes a position sensor 140 connected to the spool. In the depicted embodiment, the position sensor 140 is a linear variable differential transformer (i.e., LVDT). The output from the position sensor 140 is transmitted to the hybrid system electronic control unit 250 and/or the baseline hydraulic system 270.

As illustrated at FIG. 1, an accumulator bleed valve 64 is connected to the port 52 of the accumulator 50. The accumulator bleed valve 64 includes a first port 66 and a second port 68. The accumulator bleed valve 64 includes a first configuration 70 and a second configuration 72. In the first configuration 70, the spool of the accumulator bleed valve 64 connects the first port 66 to the second port 68. In the second configuration 72, the first port 66 and the second port 68 are blocked off. When the hydraulic system 10 is configured as a hybrid hydraulic system, the accumulator bleed valve 64 is typically positioned at the second configuration 72. Among other things, the accumulator bleed valve 64 may be used to discharge the accumulator 50 for various reasons. For example when servicing the hydraulic system 10, it may be desired to relieve the hydraulic accumulator 50 of pressure. When the mobile work machine 800, 800' is shut down, it may be desired to relieve the hydraulic accumulator 50 of pressure. There further may be other normal and abnormal situations where it is desired to relive the hydraulic accumulator 50 of internal pressure, and the accumulator bleed valve 64 may be configured at the first configuration 70 thereby draining the hydraulic accumulator 50 to tank 500.

The hydraulic system 10 may include an accumulator isolation valve 54. As depicted, the accumulator isolation valve 54 includes a first port 56 and a second port 58. The accumulator isolation valve 54 includes a first configuration 60 and a second configuration 62. In the first configuration 60, the first port 56 and the second port 58 are blocked off. In the second configuration 62, the first port 56 is connected with the second port 58. By positioning the accumulator isolation valve 54 at the first configuration 60, the accumulator 50 is effectively isolated from other components of the hydraulic system 10. When the hydraulic system 10 is operated in the hybrid mode, the accumulator isolation valve 54 is typically operated at the second configuration 62. When the hydraulic system 10 is operated as a passive ride control system, the accumulator isolation valve 54 may be configured at the first configuration 60, thereby isolating the accumulator 50 from the hydraulic transformer 20. However, a ride control valve 330 may connect the hydraulic accumulator 50 and the lift cylinder 830, 830'. When the hydraulic system 10 is operated as an active ride control system, the accumulator isolation valve 54 may be configured at the second configuration 62, thereby fluidly connecting the accumulator 50 to the hydraulic transformer 20. The ride control valve 330 may further connect the hydraulic accumulator 50 and the lift cylinder 830, 830'.

The ride control valve 330 may include a first port 332 and a second port 334. The ride control valve 330 may include a first configuration 336 and a second configuration 338. When the ride control valve 330 is at the first configuration 336, the to first port 332 and the second port 334 are connected. When the ride control valve 330 is at the second configuration 338, the first port 332 and the second port 334 are blocked off. When the ride control valve 330 is at the first configuration 336, the hydraulic system 10 may provide ride control to the work machine 800, 800'. In particular, the accumulator 50 may dynamically exchange hydraulic fluid with the lift cylinder 830, 830'. As the mobile work machine 800, 800' experiences dynamic conditions, the hydraulic accumulator 50 may absorb and release energy to the lift cylinder 830, 830'. The lift cylinder 830, 830' may thereby serve as an energy absorbing spring-mass-damper system. In certain embodiments, the accumulator isolation valve 54 may be set to the second configuration 62 and thereby connect the first rotating group 22 of the hydraulic transformer 20 to the accumulator 50. The hybrid system electronic control unit 250 and/or the baseline hydraulic system electronic control unit 272 may monitor various dynamic conditions of the mobile work machine 800, 800'. The hybrid system electronic control unit 250 and/or the baseline hydraulic system ECU 272 may dynamically adjust the variable swash plate 28 of the first rotating group 22 and thereby send a response signal to actively dynamically provide ride control with the first rotating group 22, the accumulator 50, and the lift cylinder 830, 830'.

As depicted at FIGS. 1 and 2, the hydraulic system 10 includes the flow control valve sub-system 150. In certain embodiments and in certain modes, the flow control valve sub-system 150 may operate the lift cylinder 830, 830' and/or the tilt cylinder 860, 860' independent of the directional control valves 110 and/or 130. In other embodiments and/or in other modes, the flow control valve sub-system 150 may operate the lift cylinder 830, 830' and/or the tilt cylinder 860, 860' in cooperation with the first and/or the second directional control valves 110, 130.

Turning now to FIG. 2, the flow control valve sub-system 150 will be described in detail. As depicted, the flow control valve sub-system 150 includes a connection to a return line 502 that may be used to return hydraulic fluid to the tank 500. As depicted, the flow control valve sub-system 150 may include a connection to a line 526 that is connected to a source 540 of pilot hydraulic fluid pressure. As depicted, the flow control valve sub-system 150 may further include a connection to a line 530 that is connected to the tilt cylinder 860, 860'. As illustrated, the flow control valve sub-system 150 may further include a connection to a line 532 that is connected to the lift cylinder 830, 830'. The flow control valve system 150 includes a first mode pilot valve 180 that receives a signal from the hydraulic system electronic control unit 250. The flow control valve sub-system 150 further includes a second mode pilot valve 220 that receives a signal from the hybrid system electronic control unit 250. The signal received by the first mode pilot valve 180 results in the first mode pilot valve 180 transferring a hydraulic signal to a first mode valve 160. The first mode valve 160 thereby transfers hydraulic fluid to and from the lift cylinder 830, 830'. Likewise, the signal received by the second mode pilot valve 220 results in the second mode pilot valve 220 transferring a hydraulic signal to a second mode valve 200. The second mode valve 200 thereby transfers hydraulic fluid to and from the tilt cylinder 860, 860'.

The connections to and between the first mode valve 160 and the first mode pilot valve 180 will now be described in detail. In particular, the first mode valve 160 includes a first port 162, a second port 164, and a third port 166. The first mode valve 160 includes a first configuration 172, a second configuration 174, and a third configuration 176. A position sensor 170 is connected to a spool of the first mode valve 160. When the spool is at the first configuration 172, the first port 162, the second port 164, and the third port 166 are blocked off. When the spool of the first mode valve 160 is at the second configuration 174, the first port 162 is connected to the third port 166, and the second port 164 is blocked off. When the spool of the first mode valve 160 is at the third configuration 176, the second port 164 is connected to the third port 166, and the first port 162 is blocked off.

The first mode pilot valve 180 includes a first port 182, a second port 184, a third port 186 and a fourth port 188. The first mode pilot valve 180 includes a first configuration 192, a second configuration 194, and a third configuration 196. The first mode pilot valve 180 includes an actuator 190. The actuator receives the electrical signal from the hybrid system electronic control unit 250 and correspondingly actuates a spool of the first mode pilot valve 180. In particular, the actuator 190 may position the spool at the first configuration 192 and thereby connect the second port 184 to the third port 186 and the fourth port 188. The first port 182 is blocked off when the first mode pilot valve 180 is at the first configuration 192. When the first mode pilot valve 180 is at the second configuration 194, the first port 182 is connected to the third port 186, and the second port 184 is connected to the fourth port 188. When the first mode pilot valve 180 is at the third configuration 196, the first port 182 is connected to the fourth port 188, and the second port 184 is connected to the third port 186. The first port 182 is connected to the hydraulic line 526 and is thereby connected to the pilot pressure source 540. The second port 184 is connected to the line 502 and is thereby connected to the tank 500. The third port 186 is connected to a pilot line 152 that is connected to an actuator of the spool of the first mode valve 160. In particular, when the pilot line 152 is pressurized, the first mode valve 160 is urged toward the second configuration 174. The fourth port 188 is connected to a pilot line 154 that in turn is connected to an actuator of the first mode valve 160. In particular, if the pilot line 154 is pressurized, the spool of the first mode valve 160 is urged toward the third configuration 176. The first port 162 of the first mode valve 160 is connected to a line 520. The line 520 is further connected to the second rotating group 32 of the hydraulic transformer 20. The second port 164 of the first mode valve 160 is connected to the hydraulic line 502 and is thereby connected to the tank 500. The third port 166 is connected to the line 532. The line 532 is further connected to the lift cylinder 830, 830'. A lift cylinder service pressure 286 may be monitored by monitoring pressure in the hydraulic line 532 with a pressure transducer.

The connections to and between the second mode valve 200 and the second mode pilot valve 220 will now be described in detail. In particular, the second mode valve 200 includes a first port 202, a second port 204, and a third port 206. The first mode valve 200 includes a first configuration 212, a second configuration 214, and a third configuration 216. A position sensor 210 is connected to a spool of the second mode valve 200. When the spool is at the first configuration 212, the first port 202, the second port 204, and the third port 206 are blocked off. When the spool of the second mode valve 200 is at the second configuration 214, the first port 202 is connected to the third port 206, and the second port 204 is blocked off. When the spool of the second mode valve 200 is at the third configuration 216, the second port 204 is connected to the third port 206, and the first port 202 is blocked off.

The second mode pilot valve 220 includes a first port 222, a second port 224, a third port 226, and a fourth port 228. The second mode pilot valve 220 includes a first configuration 232, a second configuration 234, and a third configuration 236. The second mode pilot valve 220 includes an actuator 230. The actuator 230 receives the electrical signal from the hybrid system electronic control unit 250 and correspondingly actuates a spool of the second mode pilot valve 220. In particular, the actuator 230 may position the spool at the first configuration 232 and thereby connect the second port 224 to the third port 226 and the fourth port 228. The first port 222 is blocked off when the second mode pilot valve 220 is set to the first configuration 232. When the second mode pilot valve 220 is set to the second configuration 234, the first port 222 is connected to the third port 226, and the second port 224 is connected to the fourth port 228. When the first mode pilot valve 220 is at the third configuration 236, the first port 222 is connected to the fourth port 228, and the second port 224 is connected to the third port 226. The first port 222 is connected to the hydraulic line 526 and is thereby connected to the pilot pressure source 540. The second port 224 is connected to the line 502 and is thereby connected to the tank 500. The third port 226 is connected to a pilot line 156 that is connected to an actuator of the spool of the second mode valve 200. In particular, when the pilot line 156 is pressurized, the second mode valve 200 is urged toward the second configuration 214. The fourth port 228 is connected to a pilot line 158 that in turn is connected to an actuator of the second mode valve 200. In particular, if the pilot line 158 is pressurized, the spool of the second mode valve 200 is urged toward the third configuration 216. The first port 202 of the second mode valve 200 is connected to a line 520. The line 520 is further connected to the second rotating group 32 of the hydraulic transformer 20. The second port 204 of the second mode valve 200 is connected to the hydraulic line 502 and is thereby connected to the tank 500. The third port 206 is connected to the line 530. The line 530 is further connected to the tilt cylinder 860, 860'. A tilt cylinder service pressure 288 may be monitored by monitoring pressure in the hydraulic line 530 with a pressure transducer.

As illustrated at FIG. 1, the lift cylinder 830, 830' includes a first port 832 (e.g., head-side port), connected to a first chamber 842 (e.g., head chamber), and a second port 834 (e.g., rod-side port) connected to a second chamber 844 (e.g., rod-side chamber). The lift cylinder 830, 830' includes a piston 846 that separates the first chamber 842 from the second chamber 844. A rod 840, 840' is connected to the piston 846 and extends through the second chamber 844. Likewise, the tilt cylinder 860, 860' includes a first port 862 (e.g., head-side port), connected to a first chamber 872 (e.g., head chamber), and a second port 864 (e.g., rod-side port) connected to a second chamber 874 (e.g., rod-side chamber). The tilt cylinder 860, 860' includes a piston 876 that separates the first chamber 872 from the second chamber 874. A rod 870, 870' is connected to the piston 876 and extends through the second chamber 874.

As illustrated at FIG. 1, the flow control valve sub-system 150 may be controlled by the signal line 266 and thereby be controlled via a dedicated controller area network. In the depicted embodiment, the flow control valve sub-system 150 is a valve known by model number ZTS16 and sold by the Eaton Corporation of Cleveland, Ohio. In other embodiments, other valves may be used.

As depicted at FIG. 1, a two-way two-position valve 300 is connected between the lift cylinder 830, 830' and the tank 500. In particular, the valve 300 includes a first port 302 and a second port 304. The valve 300 includes a first configuration 306 and a second configuration 308. When at the first configuration 306, the two-way valve 300 blocks off the first and the second ports 302, 304. When at the second configuration 308, the two-way valve 300 connects the first port 302 and the second port 304.

As illustrated at FIG. 1, a three-way three-position valve 310 is connected between the tilt cylinder 860, 860' and the tank 500 or a high pressure side of the non-priority circuit P_EF. In particular, the three-way three-position valve 310 includes a first port 312, a second port 314, and a third port 316. The valve 310 includes a first configuration 318, a second configuration 320, and a third configuration 322. As illustrated, when the valve 310 is at the first configuration 318, the first port 312, the second port 314, and the third port 316 are blocked off. In the second configuration 320, the first port 312 is connected with the second port 314, and the third port 316 is blocked off. When the valve 310 is at the third configuration 322, the first port 312 is connected to the third port 316, and the second port 314 is blocked off. The third port 316 is connected to a line 508 and thereby connected to the tank 500. The port 314 is connected to a line 528, 528B and thereby connected to the high pressure side of the non-priority circuit P_EF.

Various connections, illustrated at FIG. 1, will now be described in detail in relation to the various fluid lines to which the connections are made. The fluid lines may each be thought of as a node of the hydraulic system 10. Hydraulic fluid line 502 is connected to the tank 500, the second port 26 of the first rotating group 22, the second port 36 of the second rotating group 32, a second port 78 of a relief valve 74, a second port 68 of the accumulator bleed valve 64, and to various ports within the flow control valve sub-system 150, as described above. A hydraulic line 504 is also connected to the tank 500. The hydraulic line 504 is further connected to the second port 134 of the directional control valve 130 and the second port 114 of the directional control valve 110. A hydraulic line 506 is connected to the tank 500 and further connected to the second port 304 of the valve 300. The hydraulic line 508 is connected to the tank 500 and to the third port 316 of the valve 310.

The hydraulic line 520 is connected to the port 34 of the second rotating group 32 and further connected to various ports within the flow control valve sub-system 150, as mentioned above. A pressure 292 is measured at the hydraulic line 520. A hydraulic line 522 is connected to the first port 24 of the first rotating group 22 and to the first port 76 of the relief valve 74 and further to the second port 58 of the accumulator isolation valve 54. A hydraulic line 524 may be connected to the first port 56 of the accumulator isolation valve 54, to the port 52 of the accumulator 50, to the first port 66 of the accumulator bleed valve 64, and to the second port 334 of the valve 330. A pressure 290 may be taken at the hydraulic line 524. The hydraulic line 526 may be connected to the pilot pressure source 540 and to various connections within the flow control valve sub-system 150, as mentioned above.

A hydraulic line 528, 528A may be connected to the high pressure side of the non-priority circuit P_EF and to a check valve 128 and further to a check valve 148. The check valve 128 is positioned at the first port 112 of the directional control valve 110. Likewise, the check valve 148 is positioned at the first port 132 of the directional control valve 130. The check valve 128 allows flow from the hydraulic line 528, 528A to flow into the first port 112 but keeps flow from flowing out of the first port 112 into the hydraulic line 528, 528A. The check valve 148 allows flow from the hydraulic line 528, 528A to flow into the first port 132 but keeps flow from flowing out of the first port 132 into the hydraulic line 528, 528A. The hydraulic line 528, 528B connects the second port 314 of the valve 310 to the high pressure side of the non-priority circuit P_EF.

The hydraulic line 530 is connected to the fourth port 138 of the directional control valve 130, to the first port 862 of the tilt cylinder 860, 860', and to the third port 206 of the second mode valve 200. The hydraulic line 532 is connected to the fourth port 118 of the directional control valve 110, the first port 332 of the two-way valve 330, the port 832 of the lift cylinder 830, 830', and the third port 166 of the first mode valve 160. A hydraulic line 534 is connected to the third port 136 of the directional control valve 130, the second port 864 of the tilt cylinder 860, 860', and the first port 312 of the valve 310. A hydraulic line 536 is connected to the third port 116 of the directional control valve 110, the second port 834 of the lift cylinder 830, 830', and the first port 302 of the valve 300.

Turning now to FIGS. 3 and 4, various features of the example wheel loader 800 will be described in detail. The wheel loader 800 includes an operator station 818. The lift cylinder 830 (e.g., a pair of hydraulic cylinders) is attached to a chassis 816 of the wheel loader 800 at a first end. As depicted, the first end corresponds to the head end of the hydraulic cylinders. A pair of first attachments 856 is thereby formed between a cylinder housing of the hydraulic cylinders and the chassis 816. A pair of second attachments 858 is formed between the rods 840 of the lift cylinder 830 and the boom 824 of the wheel loader 800. The boom 824 may thereby be actuated by the lift cylinder 830.

As depicted at FIG. 5, the lift cylinder 830' (e.g., a pair of hydraulic cylinders) is attached to a chassis 816' of the wheel loader 800' at a first end. As depicted, the first end corresponds to the head end of the hydraulic cylinders. A pair of first attachments 856' is thereby formed between a cylinder housing of the hydraulic cylinders and the chassis 816'. A pair of second attachments 858' is formed between the rods 840' of the lift cylinder 830' and the boom 824' of the wheel loader 800'. The boom 824' may thereby be actuated by the lift cylinder 830'. The wheel loader 800' includes an operator cabin 818'.

As depicted at FIGS. 3 and 4, the tilt cylinder 860 is attached to the chassis 816 of the wheel loader 800 at a first end. As depicted, the first end corresponds to the head end of the hydraulic cylinder 860. A first attachment 886 is thereby formed between a cylinder housing of the hydraulic cylinder 860 and the chassis 816. A second attachment 888 is formed between the rod 870 of the tilt cylinder 860 and a bucket linkage 828 of the wheel loader 800. The bucket 826 may be actuated by the bucket linkage 828 in conjunction with the tilt cylinder 860.

As depicted at FIG. 5, the tilt cylinder 860' is attached to the chassis 816' of the wheel loader 800' at a first end. As depicted, the first end corresponds to the head end of the hydraulic cylinder 860'. A first attachment 886', similar to the first attachment 886, is thereby formed between the cylinder housing of the hydraulic cylinder 860' and the chassis 816'. A second attachment 888' is formed between the rod 870' of the tilt cylinder 860' and a bucket linkage 828' of the wheel loader 800'. The bucket 826' may be actuated by the bucket linkage 828' in conjunction with the tilt cylinder 860'. Extending the hydraulic cylinder 860' (e.g., by moving the rod 870' in a direction 821) tilts the bucket 826' in an upward direction 825. The bucket linkage 828' may be a "Z-bar" bucket linkage, as depicted at FIG. 5, that transforms extension of the hydraulic cylinder 860' into tilting of the bucket 826' in the upward direction 825. The "Z-bar" bucket linkage includes a rocking member 827 rotatably mounted on the boom 824' between a first end 827a and a second end 827b. The first end 827a includes the second attachment 888'. The second end 827b is rotatably connected to a bucket link 829 at a second end 829b of the bucket link 829. A first end 829a of the bucket link 829 is rotatably connected to the bucket 826'. Extending the hydraulic cylinder 860' rocks the rocking member 827 in a direction 823.

The relative movements between the tilt cylinder 860 and the bucket 826 of the example wheel loader 800 are opposite of the relative movements between the tilt cylinder 860' and the bucket 826' of the example wheel loader 800'. In particular, extension of the tilt cylinder 860 tilts the bucket 826 downward (see FIG. 4).

Various distinguishing features of the hydraulic system 10 will now be described according to the principles of the present disclosure.

The accumulator 50 is connected to the pump-motor 22 of the hydraulic transformer 20. Flow supplied or recovered from the actuators 830, 830', 860, 860' can be at any pressure. Hydraulic fluid stored in the accumulator 50 is typically at very high pressure. The hydraulic transformer 20 provides isolation between the actuators 830, 830', 860, 860' and the accumulator 50, except when ride control is enabled. When ride control is enabled by opening valve 330 to position 336, the directional control valve 110 is closed (i.e., at configuration 122), and the accumulator 50 is connected directly to the head chamber 842 of the lift cylinders 830, 830'.

The accumulator 50 may be isolated bi-directionally (e.g., when the accumulator isolation valve 54, the accumulator bleed valve 64, and the Ride Control valve 330 are closed).

The hydraulic system 10 uses drive shaft speed measurement and swash displacement measurement (e.g., via displacement sensors 29 and 39) to estimate flow coming from the energy recovery system transformer 20. This, combined with position feedback on the mode and directional control valves 110, 130, 160, 200, allows precise matching of flow requests from the operator. The hydraulic system 10 may thereby maintain a machine feel similar to a conventional machine. By incorporating flow estimates, a precise opening amount of the mode and directional control valves 110, 130, 160, 200 is possible and system dynamics may be robustly controlled allowing productive work to be done by the actuators 830, 830', 860, 860' while recovering energy and while using recovered energy.

The transformer 20 may be used in lieu of proportional metering to achieve flow control. In many cases, motion of the actuators 830, 830', 860, 860' may be controlled with no throttling by using the swash control 38 of pump-motor 32. Throttling may be done when supplying or recovering energy from the lift and tilt actuators 830, 830', 860, 860' simultaneously and/or when flow being recovered exceeds the sinking capacity of the transformer pump-motor 32, in which case excess flow may be throttled to tank 500 using the direction control valves 110, 130 and typical meter-out control.

The hybrid system electronic control unit 250 interfaces with the baseline electronic control unit 272. This provides means to de-stroke the main pumps of the baseline hydraulic system 270 as the additional energy source of the hybrid system can be accounted for in the overall power management of the mobile work machine 800, 800'. Otherwise, during certain times a hybrid system may fight against a baseline pump control, and other times the two energy sources may be additive. According to the principles of the present disclosure, it is better to control the main pumps of the baseline hydraulic system 270 to account for the additional energy source so that the overall power trajectory of the mobile work machine 800, 800' can be leveled and not exaggerated. This further allows for efficient engine operation.

Conventional wheel loaders with so-called "slush-box" torque converters may keep the engine saturated at full output regardless of any energy savings a hybrid system could potentially provide. According to the principles of the present disclosure, a direct interface between the transmission 100 and the hybrid system electronic control unit 250, and optionally replacing the torque converter with an automated manual transmission, will avoid unnecessary engine saturation.

According to the principles of the present disclosure, rod to tank valves 300 and 310 are used, both to avoid the necessity of independent metering and to further reduce throttling losses (e.g., there may be less loss in a binary valve than a similarly sized proportional valves). Furthermore, the low-power quick-extend feature is provided for by enabling the pressurizing of both ports 862 and 864 of the tilt actuators 830, 830'.

According to the principles of the present disclosure, the transformer 20 may be set to continuously spin, and thereby have full flow control authority. This enables engine load leveling and other functionality that is unavailable with an intermittently spinning transformer of certain other hybrid systems.

According to the principles of the present disclosure, multiple actuators (e.g., multiple linear actuators) may be hybridized, sharing a common transformer 20.

According to the principles of the present disclosure, explicit position feedback on both the mode valves and the directional control valves 110, 130, 160, 200 is provided. This, combined with knowing the rotational speed and swash displacement of the transformer pump-motors 22, 32, results in accurate flow control and the ability to maintain the same machine feel and dynamics as a conventional mobile work machine.

According to the principles of the present disclosure, the hydraulic system 10 may incorporate a load sense main pump control architecture. The input/output for the hybrid system ECU 250 may be set up to provide all necessary interface for a load sense architecture.

According to the principles of the present disclosure, the transformer 20 may be sized smaller than a total flow capacity of the mobile work machine 800, 800' as a portion of the flow may bypass the transformer 20. In particular, if a maximum capacity of the transformer 20 is reached when flow returns from the actuators 830, 830', 860, 860', the excess flow can be routed across the directional control valves 110, 130, 160, 200. Likewise, if a maximum capacity of the transformer 20 is reached when flow is supplied to the actuators 830, 830', 860, 860', the excess flow required can be supplied by the baseline hydraulic system 270 and routed across the directional control valves 110, 130. Similarly, as the transformer 20 may be coupled to the transmission 100, if a maximum capacity of the transformer 20 is reached when the transformer 20 acts to decelerate the mobile work machine 800, 800' (e.g., in combination with flow returns from the actuators 830, 830', 860, 860'), the excess flow can be routed across the directional control valves 110, 130, 160, 200 and/or the PTO clutch 84 can be disengaged. If the PTO clutch 84 is disengaged, conventional brakes may fully decelerate the mobile work machine 800, 800'. If the PTO clutch 84 is engaged, conventional brakes may fully or partially decelerate the mobile work machine 800, 800'. Likewise, if a maximum capacity of the transformer 20 is reached when the transformer 20 acts to accelerate the mobile work machine 800, 800', flow can be supplied by the baseline hydraulic system 270 and routed across the directional control valves 110, 130 to at least partially relieve the transformer 20.

By facilitating the partial use of the transformer 20 and thereby facilitating the partial use of the accumulator 50, the hydraulic system 10 permits a smaller capacity and/or more affordable transformer 20 and/or accumulator 50 to be used while maintaining control characteristics (e.g., operator feel) of the mobile work machine 800, 800'. The partial use of the transformer 20 may still cover a substantial portion of a duty cycle of the mobile work machine 800, 800'. In other words, the transformer 20 and/or the accumulator 50 may be sized based on economic models rather than for a peak capacity of the mobile work machine 800, 800'. This is especially beneficial in duty cycles that rarely see peak capacity events.

The various embodiments described above are provided by way of illustration only and should not be construed to limit the claims attached hereto. Those skilled in the art will readily recognize various modifications and changes that may be made without following the example embodiments and applications illustrated and described herein, and to without departing from the true spirit and scope of the disclosure.

What is claimed is:

1. A power system for a mobile work machine comprising:
   a prime mover;
   a power take-off for transferring power from the prime mover;
   a work implement actuated by an actuator;
   a first hydraulic circuit powered by the prime mover, the first hydraulic circuit including a first valve system for controlling movement of the actuator;
   a second hydraulic circuit including:
      a hydraulic transformer, wherein the hydraulic transformer includes a first and a second pump-motor connected by a shaft, wherein the shaft is mechanically coupled to the power-take-off such that the power take-off is adapted to mechanically drive rotation of the shaft;
      an accumulator that fluidly connects to the hydraulic transformer; and
      a second valve system for controlling movement of the actuator, wherein the second valve system is configured to selectively open and close fluid communication between the hydraulic transformer and the actuator; and
   a controller that interfaces with the first and second valve systems, the controller being adapted to operate the system in: a) a first operating state in which the first hydraulic circuit controls movement of the actuator independent of the second hydraulic circuit; b) a second operating state in which the second hydraulic circuit controls movement of the actuator independent of the first hydraulic circuit; and c) a third operating state in which the first and second hydraulic circuits jointly control movement of the actuator.

2. The power system of claim 1, further comprising a clutch for operatively engaging and disengaging the power take-off with respect to the prime mover.

3. The power system of claim 1, further comprising a transmission coupled to the prime mover for powering a drive train.

4. The power system of claim 3, wherein the power system is configured such that braking energy from the drive train can be transferred through the power take-off and the hydraulic transformer for storage at the accumulator, and energy from the accumulator can be transferred through the hydraulic transformer and the power take-off to the prime mover.

5. The power system of claim 4, wherein the system is configured such that energy from the power take-off and energy from the accumulator can be transferred through the hydraulic transformer and the second valve system to the actuator either independently or concurrently, and over-run energy from the actuator can be transferred through the second valve system and the hydraulic transformer to the power take-off and the accumulator either independently or concurrently.

6. The power system of claim 1, wherein the first pump-motor and the second pump-motor each have variable displacement.

7. The power system of claim 1, wherein the first pump-motor selectively fluidly connects to the accumulator and the second pump-motor is fluidly connected to the second valve system which is adapted to selectively open and close fluid communication between the second pump-motor and the actuator.

8. The power system of claim 7, wherein the actuator is a hydraulic cylinder having a first side and a second side, and wherein the power system is configured such that the second pump-motor is capable of being fluidly connected to only one of the first and second sides of the hydraulic cylinder.

9. The power system of claim 8, wherein a hydraulic power source of the first hydraulic circuit is configured to be independently fluidly connected to each of the first and second sides of the hydraulic cylinder via the first valve system.

10. The power system of claim 9, wherein the first side of the hydraulic cylinder is a head side and the second side of the hydraulic cylinder is a rod side, and wherein the second valve system selectively fluidly connects the second pump-motor to the head side of the hydraulic cylinder.

11. The power system of claim 1, wherein the actuator is a first actuator and the system also includes a second actuator capable of being powered by the first and second hydraulic circuits, wherein when the system is operating in the first operating state the first hydraulic circuit controls movement of at least one of the first and second actuators independent of the second hydraulic circuit, wherein when the system is operating in the second operating state, the second hydraulic circuit controls movement of at least one of the first and second actuators independent of the first hydraulic circuit, and wherein when the system is operating in the third operating state, the first and second hydraulic circuits jointly control movement of at least one of the first and second actuators.

12. The power system of claim 11, wherein the second valve system is operable in: a) a first valve state in which the first actuator is fluidly connected to the hydraulic transformer and the second actuator is not fluidly connected to the hydraulic transformer; b) a second valve state in which the second actuator is fluidly connected to the hydraulic transformer and the first actuator is not fluidly connected to the hydraulic transformer; c) a third valve state in which the first and second actuators are both fluidly connected to the hydraulic transformer; and d) a fourth valve state in which neither of the first and second actuators is fluidly connected to the hydraulic transformer.

13. The power system of claim 12, wherein the mobile work machine is a wheel loader or a backhoe loader.

14. The power system of claim 13, wherein the first actuator is a lift cylinder and the second actuator is a tilt cylinder.

15. A power system for a mobile work machine comprising:
   a prime mover;
   a power take-off for transferring power from the prime mover;
   a work implement actuated by an actuator;
   a first hydraulic circuit powered by the prime mover, the first hydraulic circuit including a first valve system for controlling movement of the actuator;
   a second hydraulic circuit including:
      a hydraulic transformer, wherein the hydraulic transformer includes a first and a second pump-motor connected by a shaft, wherein the shaft is mechanically coupled to the power-take-off such that the power take-off is adapted to mechanically drive rotation of the shaft
      an accumulator that fluidly connected to the hydraulic transformer; and
      a second valve system for controlling movement of the actuator, wherein the second valve system is configured to selectively open and close fluid communication between the hydraulic transformer and the actuator; and a controller that interfaces with the first and second valve systems, the controller being adapted to operate the system in: a) a first operating state in which the first hydraulic circuit controls movement of the actuator independent of the second hydraulic circuit b) a second operating state in which the second hydraulic circuit controls movement of the actuator independent of the first hydraulic circuit and c) a third operating state in which the first and second hydraulic circuits jointly control movement of the actuator;

wherein the first pump-motor selectively fluidly connects to the accumulator and the second pump-motor is fluidly connected to the second valve system which is adapted to selectively open and close fluid communication between the second pump-motor and the actuator;

wherein the second valve system includes a valve including a first port fluidly connected to the second pump-motor, a second port fluidly connected to a tank, and a third port fluidly connected to the actuator, the valve being positionable in a first position in which the third port is fluidly connected to the first port and fluidly disconnected from the second port, the valve being positionable in a second position in which the third port is fluidly connected to the second port and fluidly disconnected from the first port, and the valve being positionable in a third position in which the third port is fluidly disconnected from the first and second ports.

16. A power system for a mobile work machine comprising:
a prime mover;
a power take-off for transferring power from the prime mover;
first and second hydraulic actuators;
a hydraulic power source powered by the prime mover for powering the first and second hydraulic actuators;
a first valve system for opening and closing fluid communication between the hydraulic power source and the first and second hydraulic actuators;
a hydraulic transformer for powering the first and second hydraulic actuators, the hydraulic transformer including a first pump-motor and a second pump-motor connected by a shaft, wherein the power system is configured such that the power take-off is adapted to mechanically drive rotation of the shaft;
an accumulator that fluidly connects to the hydraulic transformer; and
a second valve system for opening and closing fluid communication between the hydraulic transformer and the first and second hydraulic actuators; and a controller that interfaces with the first and second valve systems, the controller being adapted to operate the system in: a) a first operating state in which the hydraulic power source drives movement of at least one of the first and second hydraulic actuators independent of the hydraulic transformer; and b) a second operating state in which the hydraulic power source drives movement of at least one of the first and second hydraulic actuators jointly with the hydraulic transformer.

17. The power system of claim 16, wherein the second valve system is operable in: a) a first valve state in which the first hydraulic actuator is fluidly connected to the hydraulic transformer and the second hydraulic actuator is not fluidly connected to the hydraulic transformer; b) a second valve state in which the second hydraulic actuator is fluidly connected to the hydraulic transformer and the first hydraulic actuator is not fluidly connected to the hydraulic transformer; c) a third valve state in which the first and second hydraulic actuators are both fluidly connected to the hydraulic transformer; and d) a fourth valve state in which neither of the first and second hydraulic actuators is fluidly connected to the hydraulic transformer.

18. The power system of claim 17, wherein the first pump-motor selectively fluidly connects to the accumulator and the second pump-motor is fluidly connected to the second valve system which is adapted to selectively open and close fluid communication between the second pump-motor and the first and second hydraulic actuators, and wherein the first and second hydraulic actuators are hydraulic cylinders each having a first side and a second side, and wherein the power system is configured such that the second pump-motor is capable of being fluidly connected to only one of the first and second sides of each of the first and second hydraulic cylinders.

19. The power system of claim 18, wherein the hydraulic power source is configured to be independently fluidly connected to each of the first and second sides of the first and second hydraulic cylinders via the first valve system.

20. The power system of claim 19, wherein the first sides of the first and second hydraulic cylinders are head sides and the second sides of the first and second hydraulic cylinders are rod sides, and wherein the second valve system selectively fluidly connects the second pump-motor to the head sides of the first and second hydraulic cylinders.

21. The power system of claim 20, wherein the mobile work machine is a wheel loader, wherein the first hydraulic cylinder is a lift cylinder and the second hydraulic cylinder is a tilt cylinder.

* * * * *